(12) United States Patent
Qiu et al.

(10) Patent No.: US 11,599,377 B2
(45) Date of Patent: Mar. 7, 2023

(54) OPEN-CHANNEL STORAGE DEVICE MANAGEMENT WITH FTL ON VIRTUAL MACHINE

(71) Applicant: ALIBABA GROUP HOLDING LIMITED, George Town (KY)

(72) Inventors: Sheng Qiu, San Mateo, CA (US); Fei Liu, San Mateo, CA (US); Shu Li, San Mateo, CA (US)

(73) Assignee: Alibaba Group Holding Limited, Grand Cayman (KY)

(*) Notice: Subject to any disclaimer, the term of this patent is extended or adjusted under 35 U.S.C. 154(b) by 25 days.

(21) Appl. No.: 16/995,691

(22) Filed: Aug. 17, 2020

(65) Prior Publication Data

US 2022/0050701 A1  Feb. 17, 2022

(51) Int. Cl.
  *G06F 9/455* (2018.01)
  *G06F 12/10* (2016.01)

(52) U.S. Cl.
  CPC ...... *G06F 9/45558* (2013.01); *G06F 9/45545* (2013.01); *G06F 12/10* (2013.01); *G06F 2009/45579* (2013.01); *G06F 2009/45583* (2013.01); *G06F 2212/152* (2013.01)

(58) Field of Classification Search
  CPC .. G06F 9/45558; G06F 9/45545; G06F 12/10; G06F 2009/45579; G06F 2009/45583; G06F 2212/152
  See application file for complete search history.

(56) References Cited

U.S. PATENT DOCUMENTS

| | | | |
|---|---|---|---|
| 2016/0210052 A1* | 7/2016 | Kanno | G06F 3/0661 |
| 2018/0173434 A1* | 6/2018 | Li | G06F 13/4282 |
| 2019/0129840 A1* | 5/2019 | Kanno | G11C 29/72 |
| 2020/0225875 A1* | 7/2020 | Oh | G06F 9/52 |
| 2021/0064291 A1* | 3/2021 | Kanno | G06F 3/0604 |
| 2021/0365369 A1* | 11/2021 | Shin | G06F 3/0679 |

* cited by examiner

*Primary Examiner* — Dong U Kim
(74) *Attorney, Agent, or Firm* — Finnegan, Henderson, Farabow, Garrett & Dunner, LLP

(57) ABSTRACT

Embodiments of the disclosure provide systems and methods accessing a storage device of a host machine. The method can include: receiving, via a first guest flash translation layer (FTL) instance, a first request for accessing the storage device from a first virtual machine running on a host machine, wherein the first request comprises a first physical address of the storage device; transmitting, via the first FTL instance, the first request to a host FTL driver; converting, via the host FTL driver, the first request into a first hardware command; transmitting, via the host FTL driver, the first hardware command to the storage device; and executing, via the solid state drive, the first hardware command.

20 Claims, 8 Drawing Sheets

OPEN-CHANNEL STORAGE DEVICE MANAGEMENT WITH FTL ON VIRTUAL MACHINE

BACKGROUND

A host system with a storage device, such as a solid state driver (SSD), can run a plurality of virtual machines. The SSD can be referred to as an open-channel solid state driver, if the SSD has no flash translation layer (FTL) implemented thereon. Conventionally, the FTL for the open-channel SSD is implemented on the host system. However, an application running on the virtual machine cannot exclusively operate a memory block of the SSD through the conventional FTL on the host system.

SUMMARY OF THE DISCLOSURE

Embodiments of the disclosure provide a computer-implemented method for accessing a storage device of a host machine. The method comprises: receiving, via a first guest flash translation layer (FTL) instance of a first virtual machine running on a guest operating system of the host machine, a first request for accessing the storage device from the first virtual machine, wherein the first request comprises a first physical address of the storage device; transmitting, via the first guest FTL instance, the first request to a host FTL driver running on a host operating system of the host machine; converting, via the host FTL driver, the first request into a first hardware command; transmitting, via the host FTL driver, the first hardware command to the storage device; and executing, via the storage device, the first hardware command to access the first physical address.

Embodiments of the disclosure also provide an apparatus. The apparatus comprises: a memory for storing a set of instructions; and at least one processor configured to execute to the set of instructions to cause the apparatus to perform: receiving, via a first guest flash translation layer (FTL) instance of a first virtual machine running on a guest operating system of the host machine, a first request for accessing the storage device from the first virtual machine, wherein the first request comprises a first physical address of the storage device; transmitting, via the first guest FTL instance, the first request to a host FTL driver running on a host operating system of the host machine; converting, via the host FTL driver, the first request into a first hardware command; transmitting, via the host FTL driver, the first hardware command to the storage device; and executing, via the storage device, the first hardware command to access the first physical address.

Embodiments of the disclosure also provide a host machine including one or more non-transitory computer readable mediums that store a set of instructions that is executable by at least one processor of the host machine to cause the host machine to perform a method for accessing a storage device of a host machine. The method can comprises: receiving, via a first guest flash translation layer (FTL) instance of a first virtual machine running on a guest operating system of the host machine, a first request for accessing the storage device from the first virtual machine, wherein the first request comprises a first physical address of the storage device; transmitting, via the first guest FTL instance, the first request to a host FTL driver running on a host operating system of the host machine; converting, via the host FTL driver, the first request into a first hardware command; transmitting, via the host FTL driver, the first hardware command to the storage device; and executing, via the storage device, the first hardware command to access the first physical address.

Additional features and advantages of the disclosed embodiments will be set forth in part in the following description, and in part will be apparent from the description, or may be learned by practice of the embodiments. The features and advantages of the disclosed embodiments may be realized and attained by the elements and combinations set forth in the claims.

It is to be understood that both the foregoing general description and the following detailed description are exemplary and explanatory only and are not restrictive of the disclosed embodiments, as claimed.

BRIEF DESCRIPTION OF THE DRAWINGS

Embodiments and various aspects of the present disclosure are illustrated in the following detailed description and the accompanying figures. Various features shown in the figures are not drawn to scale.

DETAILED DESCRIPTION

Particular aspects of the present disclosure are described in greater detail below. The terms and definitions provided herein control, if in conflict with terms or definitions incorporated by reference. The term "exemplary" is used in the sense of "example" rather than "ideal."

A virtual machine is an emulation of a computer system that can provide functionality of a physical computer. Unlike the conventional design, in embodiments of this disclosure, a virtual machine is provided with a guest flash translation layer (FTL) instance for sending a request associated with a physical address of a storage device (e.g., solid state drive (SSD)) of a host machine, and the host machine running one or more virtual machine is provided with a host FTL driver for verifying and processing the request. Therefore, the virtual machine according to embodiments of the disclosure can operate on physical addresses of the storage device (e.g., SSD) of the host machine directly, while the data security of each virtual machine can be ensured by the host FTL driver.

The guest FTL instance can map logical block addresses (LBAs) (e.g., sector numbers of an SSD) on a host side to physical block addresses (PBAs) of the flash memory. This process can also be referred to as LBA2PBA mapping. To implement the FTL function in a virtual machine, an apparatus for providing virtual machine service can be provided as below.

Figure 1A:
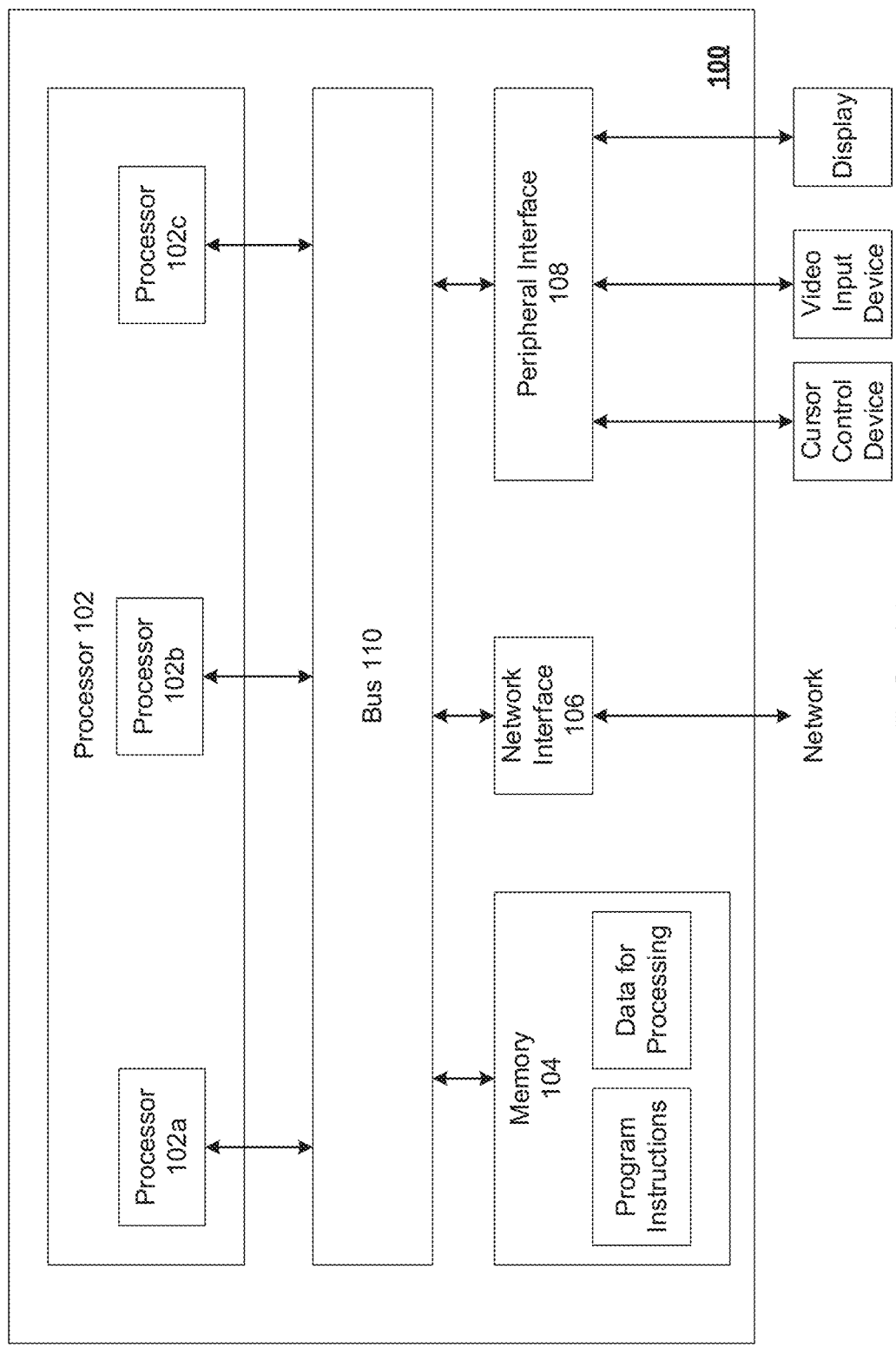
FIG. 1A is a block diagram of an exemplary apparatus for providing virtual machine service, according to some embodiments of this disclosure.

FIG. 1A is a block diagram of an exemplary apparatus 100 for providing virtual machine service, according to some embodiments of this disclosure. As shown in FIG. 1A, apparatus 100 can include a processor 102, a memory 104, a network interface 106, a peripheral interface 108, and a bus 110.

When processor 102 executes instructions and methods described herein, apparatus 100 can become a specialized machine for providing virtual machine service. Processor 102 can be any type of circuitry capable of manipulating or processing information. For example, processor 102 can include any combination of any number of a central processing unit (or "CPU"), a graphics processing unit (or "GPU"), a neural processing unit ("NPU"), a microcontroller unit ("MCU"), an optical processor, a programmable logic controller, a microcontroller, a microprocessor, a digital signal processor, an intellectual property (IP) core, a Programmable Logic Array (PLA), a Programmable Array Logic (PAL), a Generic Array Logic (GAL), a Complex Programmable Logic Device (CPLD), a Field-Programmable Gate Array (FPGA), a System On Chip (SoC), an Application-Specific Integrated Circuit (ASIC), or the like. In some embodiments, processor 102 can also be a set of processors grouped as a single logical component. For example, as shown in FIG. 1A, processor 102 can include multiple processors, including processor 102a, processor 102b, and processor 102n.

Memory 104 can be configured to store data (e.g., a set of instructions, computer codes, intermediate data, or the like). For example, as shown in FIG. 1A, the stored data can include program instructions (e.g., program instructions for implementing steps of a method for processing video content and data for processing (e.g., a video sequence, video bitstream, or video stream). Processor 102 can access the program instructions and data for processing (e.g., via bus 110), and execute the program instructions to perform an operation or manipulation on the data for processing. Memory 104 can include a high-speed random-access storage device or a non-volatile storage device. In some embodiments, memory 104 can include any combination of any number of a random-access memory (RAM), a read-only memory (ROM), an optical disc, a magnetic disk, a hard drive, a solid-state drive (SSD), a flash drive, a security digital (SD) card, a memory stick, a compact flash (CF) card, or the like. Memory 104 can also be a group of memories (not shown in FIG. 1A) grouped as a single logical component.

Bus 110 can be a communication device that transfers data between components inside apparatus 100, such as an internal bus (e.g., a CPU-memory bus), an external bus (e.g., a universal serial bus port, a peripheral component interconnect express port), or the like.

For ease of explanation without causing ambiguity, processor 102 and other data processing circuits can be collectively referred to as a "data processing circuit" in this disclosure. The data processing circuit can be implemented entirely as hardware, or as a combination of software, hardware, or firmware. In addition, the data processing circuit can be a single independent module or can be combined entirely or partially into any other component of apparatus 100.

Apparatus 100 can further include network interface 106 to provide wired or wireless communication with a network (e.g., the Internet, an intranet, a local area network, a mobile communications network, or the like). In some embodiments, network interface 106 can include any combination of any number of a network interface controller (NIC), a radio frequency (RF) module, a transponder, a transceiver, a modem, a router, a gateway, a wired network adapter, a wireless network adapter, a Bluetooth adapter, an infrared adapter, an near-field communication ("NFC") adapter, a cellular network chip, or the like.

In some embodiments, optionally, apparatus 100 can further include peripheral interface 108 to provide a connection to one or more peripheral devices. As shown in FIG. 1A, the peripheral device can include, but is not limited to, a cursor control device (e.g., a mouse, a touchpad, or a touchscreen), a keyboard, a display (e.g., a cathode-ray tube display, a liquid crystal display, or a light-emitting diode display), a video input device (e.g., a camera or an input interface coupled to a video archive), or the like.

Figure 1B:
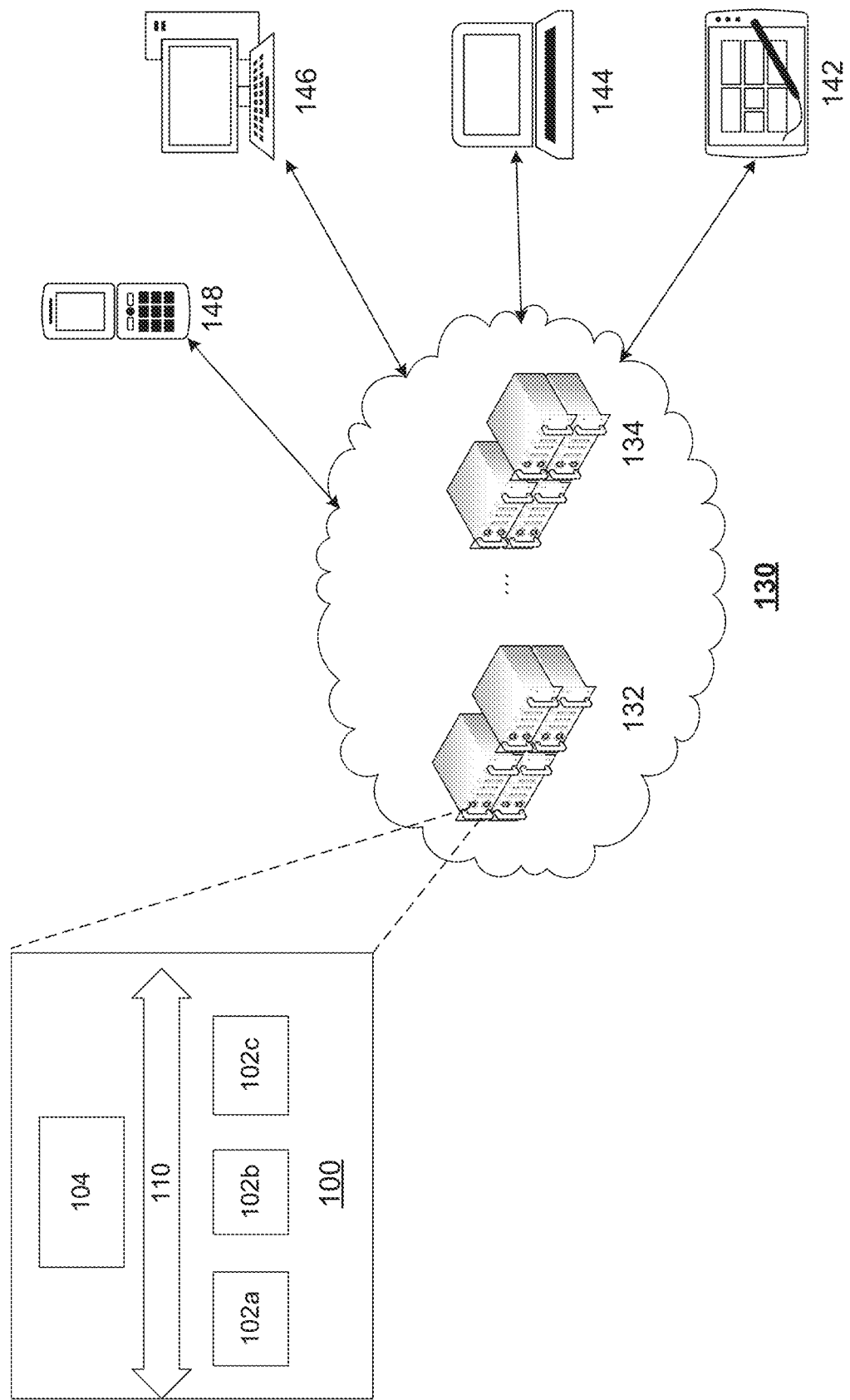
FIG. 1B illustrates a schematic diagram of an exemplary cloud system, according to embodiments of the disclosure.

FIG. 1B illustrates a schematic diagram of an exemplary cloud system 130 incorporating apparatus 100, according to embodiments of the disclosure.

As shown in FIG. 1B, cloud system 130 can provide virtual machine service to a plurality of client terminals (e.g., elements 142-148), and can include a plurality of computing servers (e.g., elements 132 and 134). The plurality of computing servers can be grouped physically or virtually in one or more networks that together form cloud system 130. The one or more networks can be private, public, community, or a combination thereof. In some embodiments, a computing server 132 or 134 can be, for example, apparatus 100 of FIG. 1A. Apparatus 100 is shown in FIG. 1B in a simplified manner for simplicity and clarity. The plurality of client terminals can include a tablet 142, a laptop 144, a desk-top computer 146, a mobile phone 148, or the like. Computing servers 132 and 134 can be referred to as remote machines or host machines, while the plurality of client terminals 142-148 can be referred to as local machines or guest machines.

In some embodiments, a remote machine (e.g., 132 or 134) can execute a virtual machine, which can provide an execution session within which virtual applications execute on behalf of a user of a local machine (e.g., 144). It is appreciated that cloud system 130 including remote machines 132 and 134 can execute more than one virtual machines, and these virtual machines can run on one or more local machines.

The virtual machine runs on a host operating system that runs on the remote machine, and the virtual machine further runs a guest operating system (OS). The guest OS can provide process control, memory management, and other services required by the virtual applications. In some embodiments of the disclosure, the guest OS can further include a guest flash translation layer (FTL) driver, and the host OS can further include a host FTL driver. The guest FTL driver and the host FTL driver can be used to manage direct operations of a virtual machine on open-channel SSDs of cloud system 130.

Figure 2A:
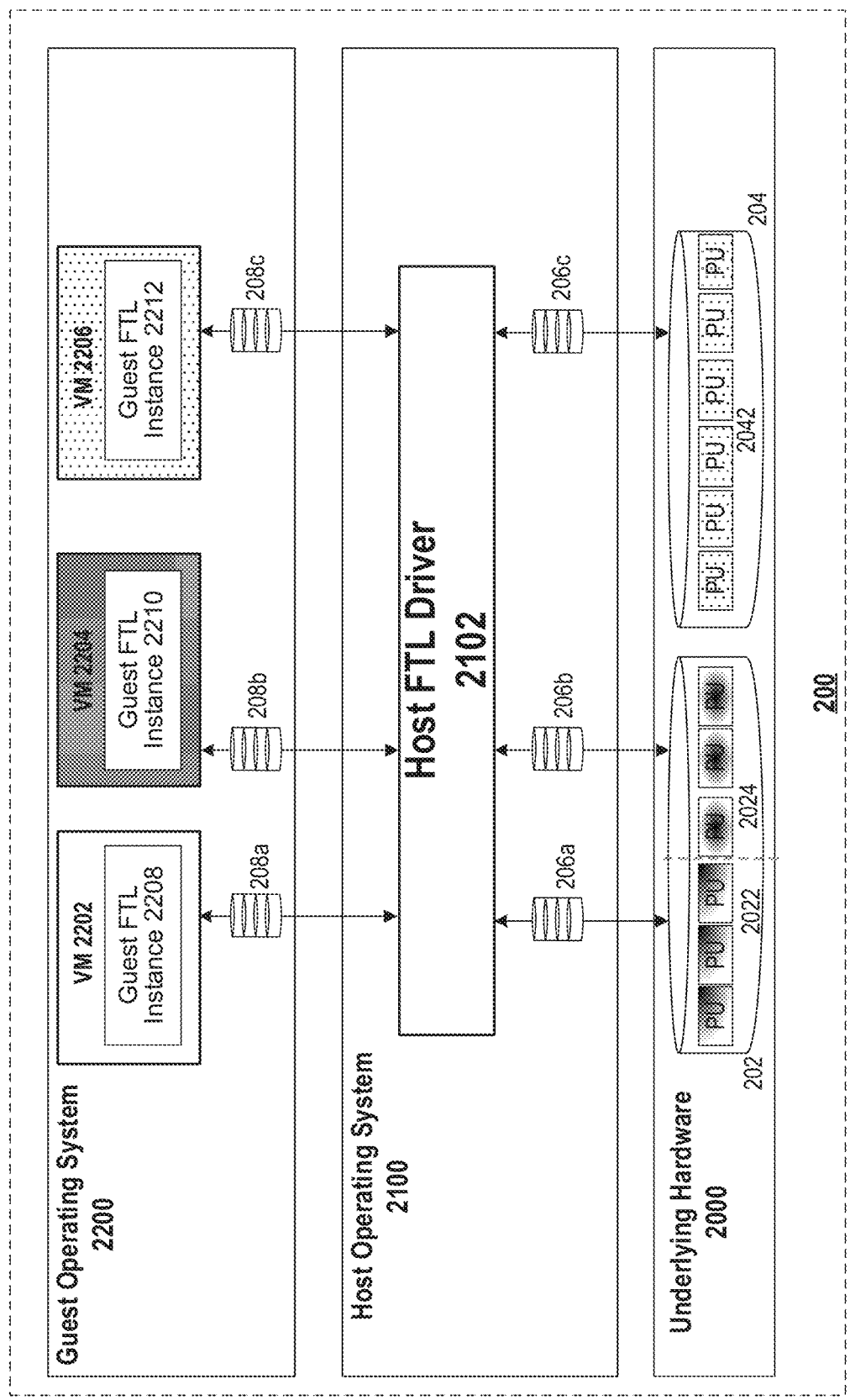
FIG. 2A illustrates a schematic diagram of managing open-channel SSDs on a host machine, according to some embodiments of the disclosure.

FIG. 2A illustrates a schematic diagram of managing open-channel SSDs on a host machine 200, according to some embodiments of the disclosure.

Host machine 200 can be implemented by, for example, apparatus 100 described with reference to FIG. 1A. Underlying hardware 2000 of host machine 200, on which a host operating system (OS) 2100 runs, can include open-channel SSDs 202 and 204. It is appreciated that underlying hardware 2000 also includes components, such as a processor, a network interface, a peripheral interface, and a bus, detailed description of which can be referred to FIG. 1A.

Open-channel SSDs 202 and 204 expose to host OS 2100 a collection of channels, each channel containing a group of Parallel Units (PUs). For example, as shown in FIG. 2A, SSD 202 can include a group 2022 of PUs and a group 2024 of PUs, and SSD 204 can include a group 2042 of PUs. A PU can cover one or more physical die of an open-channel SSD, and a die may only be a member of one PU. Each PU can process a single I/O request at a time.

Host OS 2100 can include a host flash translation layer (FTL) driver 2102. Host FTL driver 2102 can be configured to convert a guest FTL request of a guest FTL instance into a hardware command that can be executed by an SSD (e.g., 202 or 204) and convert a hardware signal (e.g., a post completion signal) into a guest response. Host FTL driver 2102 can also be configured to determine if a physical address associated with the guest FTL request is accessible by the virtual machine running the guest FTL instance. It is appreciated that host OS 2100 can also include an interface for communicating with a guest OS 2200, and host FTL driver 2102 can incorporate a protocol (e.g., an FTL protocol) for communicating with guest OS 2200. Additionally, host OS 2100 can create queues (e.g., 206a-206c) for storing hardware commands that can be executed by the SSD.

Guest OS 2200 can include one or more virtual machines 2202-2206 and a guest FTL driver (to be discussed with reference to FIG. 2B). The guest FTL driver can be implemented using a virtual IO frame work, (e.g., Virtio). The virtual IO frame work can virtualize interfaces for components of the virtual machine, such as a virtual SSD of the virtual machine, and cooperate with host OS 2100 to allow a virtual machine of guest OS 2200 to access resources in the host machine. In some embodiments, the guest FTL driver can be instantiated into a guest FTL instance for each virtual machine. For example, virtual machines 2202-2206 can include guest FTL instances 2208-2212, respectively. It is appreciated that each virtual machine can include a virtual interface for communicating with host OS 2100 and receiving instructions from a user of the virtual machine. Additionally, the guest OS 2200 also creates a virtual queue (e.g., 208a, 208b, or 208c) for a virtual machine. The virtual queue can store a request for accessing an SSD, which can be further fetched by host FTL driver 2102.

Figure 2B:
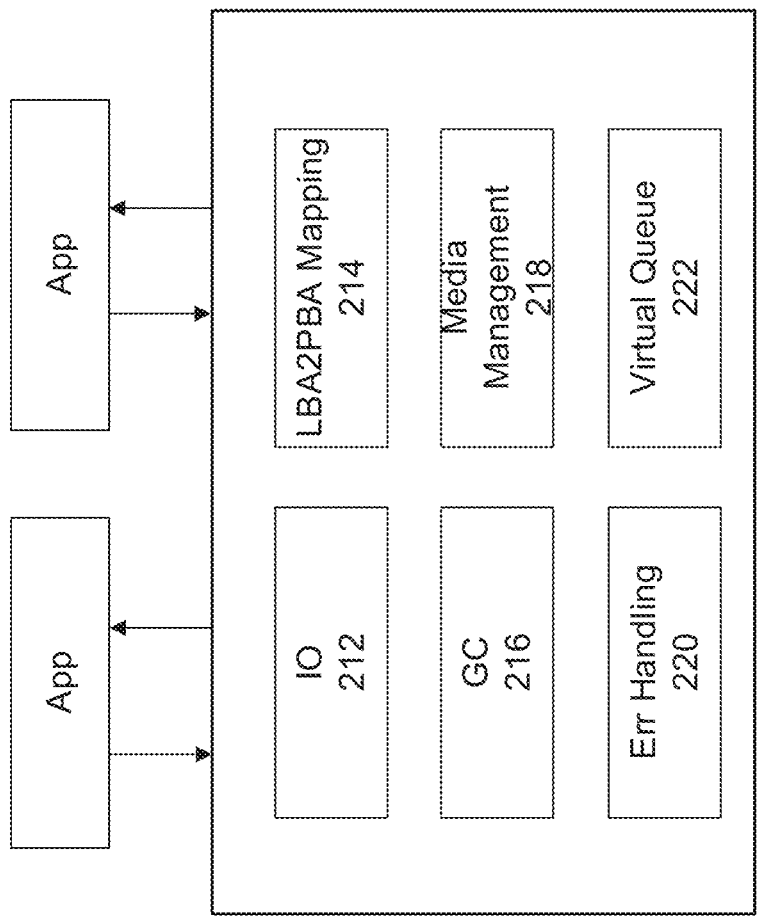
FIG. 2B illustrates a schematic diagram of a guest FTL driver, according to some embodiments of the disclosure.

FIG. 2B illustrates a schematic diagram of a guest FTL driver 210, according to some embodiments of the disclosure.

As shown in FIG. 2B, guest FTL driver 210 can include at least one of an input/output (IO) unit 212, a logical block address to physical block address (LBA2PBA) mapping unit 214, a garbage collection unit 216, a media management 218, an error handling unit 220, and a virtual queue 222.

IO unit 212 can be a virtual interface for transceiving information (e.g., a physical address associated with a request for accessing the SSD) with the guest OS and the host OS. For example, when a user of a virtual machine sends out a request for accessing an SSD, the physical address associated with the request can be passed to guest FTL driver 210 through IO unit 212.

Figure 2C:
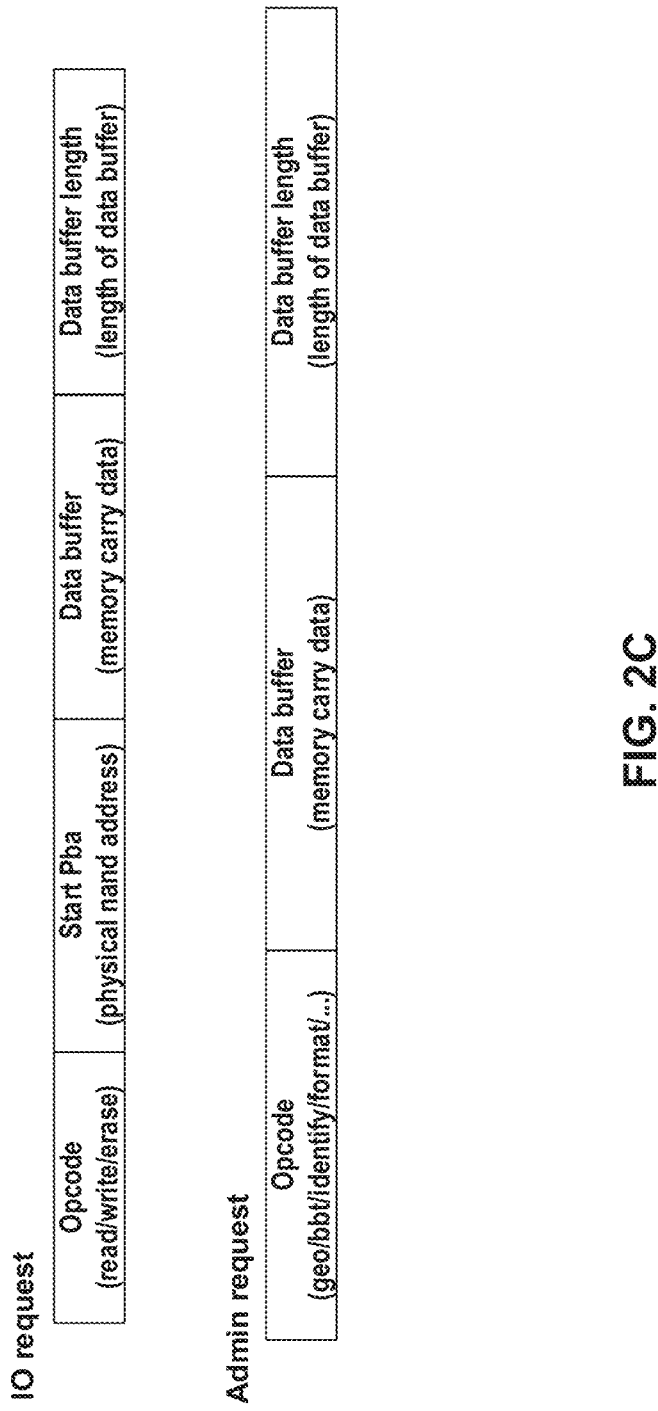
FIG. 2C illustrates exemplary request formats of an IO request and an administration request, according to some embodiments of the disclosure.

In some embodiments, guest FTL driver 210 can provide two types of requests, including an IO request and an administration request. FIG. 2C illustrates exemplary request formats of an IO request and an administration request, according to some embodiments of the disclosure. The IO request can be directed to a read operation for reading data from an address of the SSD, a write operation for writing data into an address of the SSD, or an erase operation for erasing data from an address of the SSD. As shown in FIG. 2C, the IO request can include an operation code field for indicating a type of the operation (e.g., read, write, or erase), a physical start address field, a data buffer field for storing memory data, and a data buffer length field for indicting a length of the data buffer. The administration request can be direct to administration operations, such as a geometry operation, a bad block table operation, an identify operation, a format operation, and the like. As shown in FIG. 2C, the administration request can include an operation code field for indicating a type of the operation, a data buffer field for storing memory data, and a data buffer length field for indicting a length of the data buffer.

LBA2PBA mapping unit 214 can be configured to map the logical address associated with the request (e.g., an IO request or an administration request) to a physical address of the SSD, so that the virtual machine can have direct access to PUs of the SSD.

Garbage collection unit 216 can be configured to systematically identify pages containing unneeded data (e.g., deleted data, modified data, and the like) and clear blocks of unneeded data during off-peak times to maintain optimal write speeds during normal operations.

Media management unit 218 can be configured to monitor a number of times that an SSD page/block has been read/written, and balance read/write times across SSD pages/blocks. Media management unit 218 can also identify an error in an SSD page/block, and invite error handling unit 220 to handle the SSD page/block.

Error handling unit 220 can be configured to repair or regenerate metadata stored in an SSD page/block and log an error report.

Virtual queue 222 (also see queue 208a, 208b, or 208c of FIG. 2A) can be configured to store the guest FTL requests sequentially. In some embodiments, virtual queue 222 can be implemented by a memory space that is accessible to both a guest FTL instance and the host FTL driver, so that data (e.g., guest FTL requests or hardware post completion signal) stored in virtual queue 222 can accessed and fetched by both the guest FTL instance and the host FTL driver. In other words, the communication between the guest FTL instance and the host FTL driver is implemented through virtual queue 222.

Figure 3:
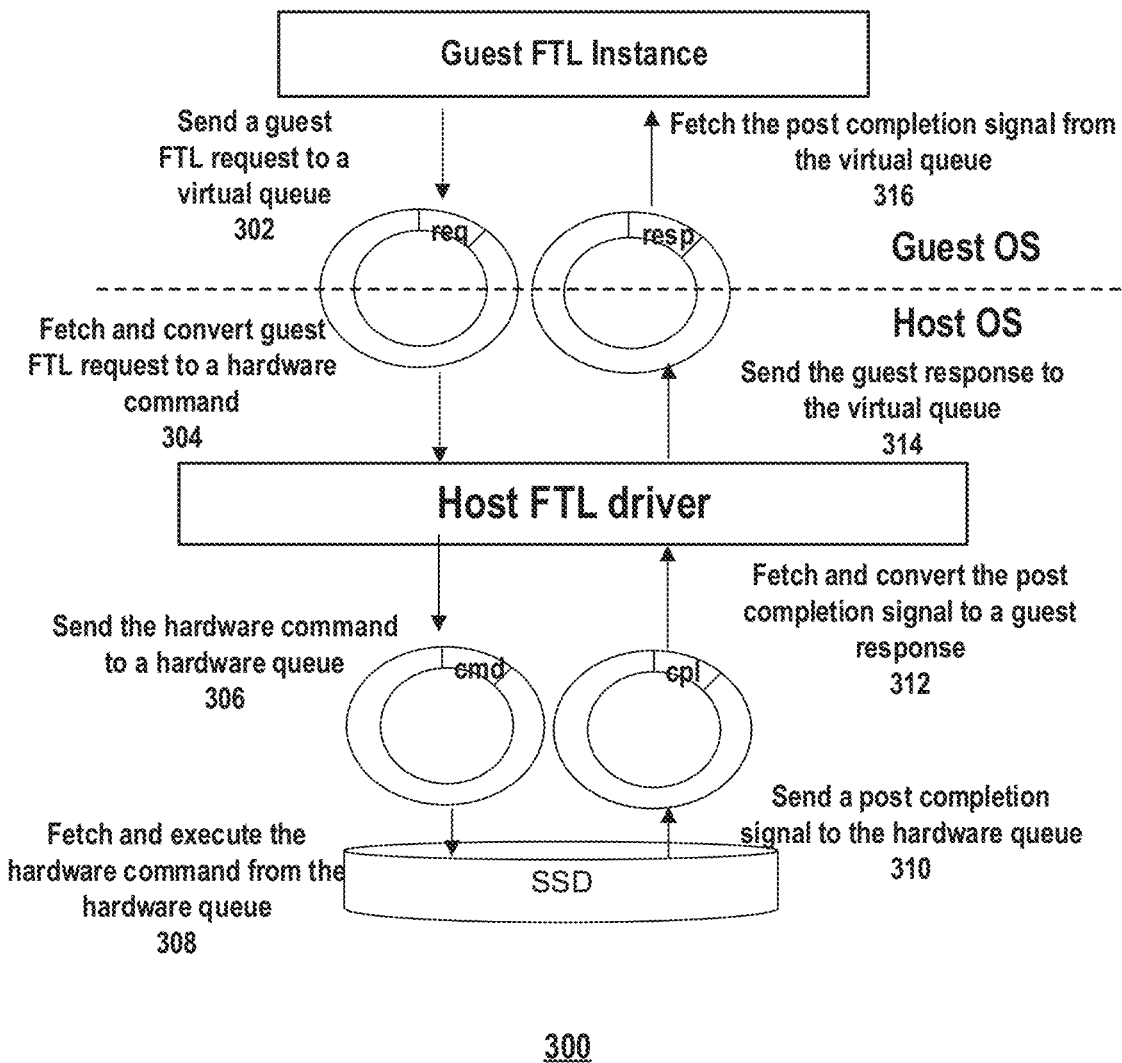
FIG. 3 is a flowchart of an exemplary process of a guest FTL instance operating on an SSD, according to some embodiments of the disclosure.

FIG. 3 is a flowchart of an exemplary process 300 of a guest FTL instance operating on an SSD, according to some embodiments of the disclosure. As shown in FIG. 3, process 300 can include steps below.

At step 302, a guest FTL instance (e.g., guest FTL instance 2208 of FIG. 2) can send a guest FTL request for accessing the SSD to a virtual queue (e.g., virtual queue 222). It is appreciated that the guest FTL request can be received from a virtual machine running on a host machine. For example, an application of the virtual machine can generate an instruction related to a logical address, and send out this instruction to the guest FTL instance. As discussed above, a logical address associated with the instruction can be mapped to a physical address in the SSD using e.g., LBA2PBA mapping unit 214 of a guest FTL instance. Thus, when the guest FTL instance sends the guest FTL request to the virtual queue, the guest FTL request contains the physical address in the SSD.

At step 304, a host FTL driver (e.g., host FTL driver 2102 of FIG. 2) can fetch the guest FTL request from the virtual queue and convert the guest FTL request to a hardware command that is executable by the SSD. In some embodiments, the guest FTL request is presented in a format that is different from the hardware command, and can be "translated" into the hardware command before being executed. In some embodiments, the guest FTL request can contain an instruction that is executable by the SSD, and host FTL driver can forward the instruction as a hardware command.

As discussed above, the virtual queue is accessible to both the guest FTL instance and the host FTL driver. Therefore, the guest FTL request can be passed to the host FTL driver through the virtual queue.

A virtual machine is only allowed to access a given range of physical addresses, so that the data security for each virtual machine can be guaranteed. Therefore, in some embodiments, the host FTL driver can also parse the guest FTL request of a virtual machine and determine if the guest FTL request is associated with an accessible range of physical addresses. If the host FTL driver determines that the guest FTL request is associated with an address out of the accessible range, the host FTL driver can send an error signal back to the virtual queue.

At step 306, the host FTL driver can send the hardware command to a hardware queue. The hardware queue is implemented in the memory of the host machine, for storing one or more hardware commands. It is appreciated that only the hardware command associated with an address within the accessible range can be sent to the hardware queue.

At step 308, the SSD can fetch the hardware command from the hardware queue and execute the hardware command, so as to operate on parallel units of the SSD as the guest FTL instance required.

At step 310, the SSD can send a post completion signal of the SSD operation to the hardware queue 310. Similarly as fetching a hardware command from the hardware queue, the host FTL driver, at step 312, can fetch and convert the post completion signal to a guest response.

At step 314, the host FTL driver can send the guest response to the virtual queue. Then, the guest FTL instance can fetch the guest response from the virtual queue at step 316. With the receipt of the guest response, the guest FTL instance can be aware of the completion of its SSD operation request.

Figure 4:
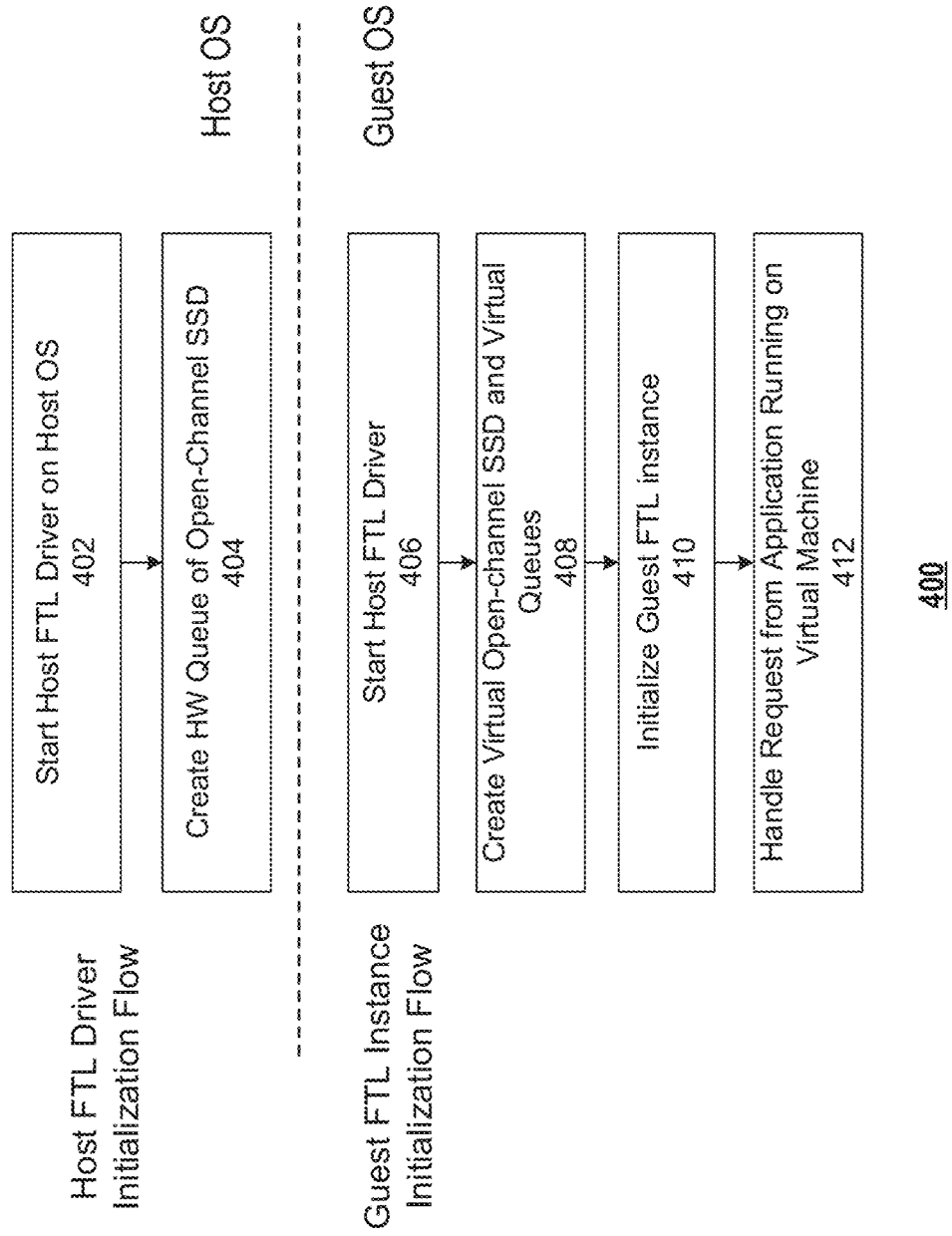
FIG. 4 illustrates an exemplary flow chart of initialization of a host FTL driver and a guest FTL instance, according to some embodiments of the disclosure.

FIG. 4 illustrates an exemplary flow chart of initialization 400 of a host FTL driver and a guest FTL instance, according to some embodiments of the disclosure.

Initialization 400 can include a host FTL driver initialization flow performed at a host OS side and a guest FTL instance initialization flow performed at a guest OS side. The host FTL driver initialization flow and the guest FTL instance initialization flow can be performed in sequence or in parallel.

As shown in FIG. 4, the host FTL driver initialization flow can be performed by the host OS and can include the following steps. These steps.

At step 402, the host FTL driver can be started on the host OS. Then, hardware queues of an open-channel SSD can be created at step 404 for receiving hardware commands. A hardware queue can be associated with a group of parallel units (PUs), so that the hardware command from a hardware queue can be only applied on a group of PUs corresponding to the hardware queue.

The guest FTL instance initialization flow can be performed by the guest OS and can include the following steps.

At step 406, the host FTL driver can be started in the guest OS.

Then, at step 408, a virtual open-channel SSD and a virtual queue can be created for a virtual machine running on the guest OS. It is appreciated that the virtual queue can be corresponding to a hardware queue created at step 404, and each virtual queue and a hardware queue corresponding to the virtual queue can be associated with a group of parallel units (PUs) of the open-channel SSD. If a virtual queue or a hardware queue is not associated with a certain group of PUs, requests or commands in the virtual queue or the hardware queue cannot be executed to access the certain group of PUs.

At step 410, a guest FTL instance can be initialized. The host FTL driver can be instantiated to create one or more guest FTL instance. Each guest FTL instance can be associated with a virtual queue, which corresponds to a group of PUs through a corresponding hardware queue. Therefore, each guest FTL instance can only be associated with a group of PUs through the corresponding virtual queue and hardware queue. In other words, a virtual machine can only operate on a group of PUs corresponding to the guest FTL instance of the virtual machine. To avoid any possible data security breach, groups of PUs corresponding to respective guest FTL instances have no common PU.

At step 412, a request from an application running on a virtual machine can be handled. The description of handling a request has been made with reference to FIG. 3, and will not be repeated herein.

Therefore, by running a guest FTL instance on a virtual machine, the virtual machine can perform direct operation on PUs of an SSD of a host machine, as the guest FTL instance can translate logical addresses into physical addresses within the virtual machine. Also, because a virtual machine is only allowed to operate on a group of PUs, the performance isolation and data security can be ensured.

Figure 5:
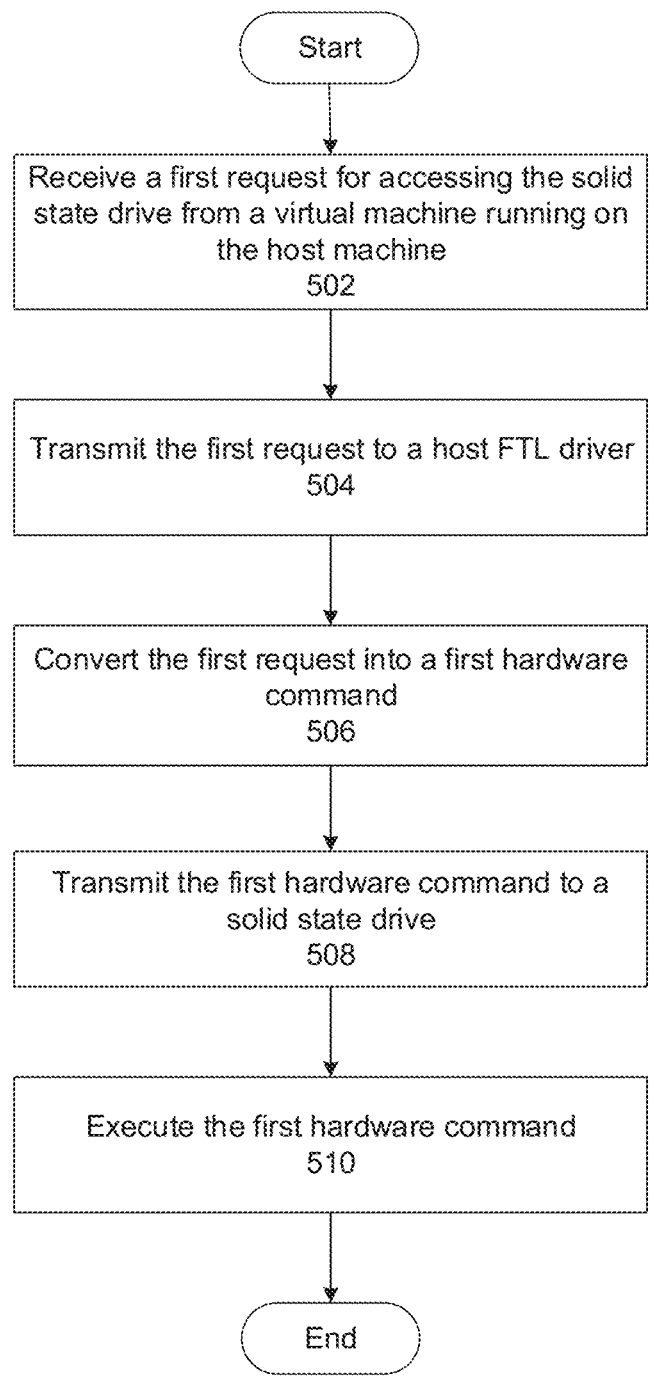
FIG. 5 is a flowchart of a compute-implemented method for accessing a solid state drive of a host machine, according to some embodiments of the disclosure.

FIG. 5 is a flowchart of a compute-implemented method 500 for accessing a solid state drive (SSD) of a host machine, according to some embodiments of the disclosure. Method 500 can be implemented by, for example, apparatus 100 of FIG. 1A running as a host machine (e.g., host machine 200 of FIG. 2A). The host machine can run a host operating system (OS) and a guest OS. Method 500 can include steps as below.

At step 502, a first guest flash translation layer (FTL) instance can receive a first request for accessing the solid state drive from a first virtual machine running on the host machine. As discussed above, the first guest FTL instance can be generated by instantiating a guest FTL driver. The first request can be related to an application running on the first virtual machine of the guest OS. For example, the application running on the first virtual machine can make an instruction for accessing a logical address, and the first guest FTL instance can map the logical address to a physical address on the SSD using e.g., LBA2PBA mapping unit 214 of FIG. 2B.

In some embodiments, the first request can include an input/output (IO) request or an administration request. As discussed with reference to FIG. 2C, the IO request can include a first operation code field, a start physical address field, a first data buffer field, and a first data buffer length field. And the administration request can include a second operation code field, a second data buffer field, and a second data buffer length field. Thus, the first request can include a first physical address of the SSD.

Therefore, the IO request is associated with a read command, a write command, or an erase command, and the administration request is associated with a geometry command, a bad block table command, an identify command, or a format command.

In some embodiments, as the guest OS can run more than one virtual machine, a second guest FTL instance can also be generated for another virtual machine by instantiating the guest FTL driver. Therefore, a second request for accessing the solid state drive can be received from a second virtual machine running on the host machine. Similarly, the second request can include a second physical address of the SSD.

At step 504, the first FTL instance can transmit the first request to a host FTL driver. The host FTL driver can run on the host OS.

In some embodiments, the guest OS can include a first guest queue (e.g., virtual queue 222 of FIG. 2) for storing the first request and a second guest queue for storing the second request. The first and second guest queues can also be accessible by the host FTL driver. Therefore, by fetching a guest request (e.g., the first guest request or the second guest request) from a corresponding guest queue, the host FTL driver of the host OS can receive the guest request from a guest FTL instance of the guest OS.

At step 506, the host FTL driver can convert the first request into a first hardware command. Similarly, the host FTL driver can also convert the second request into a second hardware command.

At step 508, the host FTL driver can transmit the first hardware command to the solid state drive. Similarly, the second hardware command can also be transmitted to the solid state drive.

In some embodiments, the solid state drive can include a first host queue for storing the first hardware command and a second host queue for storing the second hardware command. The first and second host queues can be accessible by both the host FTL driver and the solid state drive, so that commands at the host FTL driver can be fetched by the solid state driver for execution.

At step 510, the solid state drive can execute the first hardware command and the second hardware command. As discussed above, each guest FTL instance can be only associated with a group of parallel units (PUs) through the corresponding virtual queue and hardware queue. Thus, the solid state drive can operate a first group of PUs according to the first hardware command and operate a second group of PUs according to the second hardware command, and the first group of PUs and the second group of PUs have no common PU. The first physical address can be directed to one or more PUs of the first group and the second physical address can be directed to one or more PUs of the second group. As discussed above, the first group of PUs is only accessible by the first virtual machine and the second group of PUs is only accessibly by the second virtual machine, so as to data of the first and second virtual machines is isolated from each other.

After the execution of a hardware command corresponding to a request for accessing the solid state drive, the solid state drive can transmit a post completion signal to the host FTL driver. For example, as discussed with reference to FIG. 3, the post completion signal can also be placed in a corresponding hardware queue, so that the host FTL driver can fetch the post completion signal. Then, the host FTL driver can convert the post completion signal into a guest response to the guest FTL instance. In some embodiments, the host FTL driver can place the guest response in a corresponding guest queue, and transmit the guest response to the guest FTL instance using the corresponding guest queue.

In some embodiments, method 500 can further include an initialization stage before step 502. For example, as discussed with reference to FIG. 4, the initialization stage can include starting the host FTL driver on the host operating system; creating the second queue on the solid state drive; starting a guest FTL driver for the virtual machine on the guest operating system; creating a virtual SSD and the first queue; and initializing the first FTL instance using the guest FTL driver.

Embodiments of the disclosure also provide a computer program product. The computer program product may include a non-transitory computer readable storage medium having computer readable program instructions thereon for causing a processor to carry out the above-described methods.

The computer readable storage medium may be a tangible device that can store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

The computer readable program instructions for carrying out the above-described methods may be assembler instructions, instruction-set-architecture (ISA) instructions, machine instructions, machine dependent instructions, microcode, firmware instructions, state-setting data, or source code or object code written in any combination of one or more programming languages, including an object-oriented programming language, and conventional procedural programming languages. The computer readable program instructions may execute entirely on a computer system as a stand-alone software package, or partly on a first computer and partly on a second computer remote from the first computer. In the latter scenario, the second, remote computer may be connected to the first computer through any type of network, including a local area network (LAN) or a wide area network (WAN).

The computer readable program instructions may be provided to a processor of a computer, or other programmable data processing apparatus to produce a machine, such that the instructions, which execute via the processor of the computer or other programmable data processing apparatus, create means for implementing the above-described methods.

The embodiments may further be described using the following clauses:

1. A computer-implemented method for accessing a storage device of a host machine, comprising:

receiving, via a first guest flash translation layer (FTL) instance of a first virtual machine running on a guest operating system of the host machine, a first request for accessing the storage device from the first virtual machine, wherein the first request comprises a first physical address of the storage device;

transmitting, via the first guest FTL instance, the first request to a host FTL driver running on a host operating system of the host machine;

converting, via the host FTL driver, the first request into a first hardware command;

transmitting, via the host FTL driver, the first hardware command to the storage device; and executing, via the storage device, the first hardware command to access the first physical address.

2. The method according to clause 1, further comprising:
receiving, via a second guest FTL instance, a second request for accessing the storage device from a second virtual machine running on the host machine; and
converting, via the host FTL driver, the second request into a second hardware command, wherein the second request comprises a second physical address of the storage device.

3. The method according to clause 2, further comprising:
operating a first group of parallel units (PUs) according to the first hardware command; and
operating a second group of PUs according to the second hardware command, wherein the first group of PUs and the second group of PUs have no common PU.

4. The method according to clause 3, wherein the first group of PUs is only accessible by the first virtual machine and the second group of PUs is only accessibly by the second virtual machine.

5. The method according to any one of clauses 2-4, wherein
the guest OS comprises a first guest queue for storing the first request and a second guest queue for storing the second request, the first and second guest queues being accessible by the host FTL driver; and
the storage device comprises a first host queue for storing the first hardware command and a second host queue for storing the second hardware command, the first and second host queues being accessible by both the host FTL driver and the storage device.

6. The method according to any one of clauses 1-5, further comprising:
transmitting, via the storage device, a post completion signal to the host FTL driver;
converting, via the host FTL driver, the post completion signal into a guest response to the guest FTL instance; and
transmitting, via the host FTL driver, the guest response to the guest FTL instance.

7. The method according to any one of clauses 1-6, wherein the first request comprises an input/output (IO) request or an administration request.

8. The method according to clause 7, wherein
the IO request comprises a first operation code field, a start physical address field, a first data buffer field, and a first data buffer length field; and
the administration request comprises a second operation code field, a second data buffer field, and a second data buffer length field.

9. The method according to clause 7 or 8, wherein
the IO request is associated with a read command, a write command, or an erase command, and
the administration request is associated with a geometry command, a bad block table command, an identify command, or a format command.

10. The method according to any one of clauses 5-9, further comprising:
starting the host FTL driver on the host operating system;
creating the second queue on the storage device;
starting a guest FTL driver on the guest operating system;
creating a virtual storage device and the first queue; and
initializing the first FTL instance using the guest FTL driver.

11. An apparatus, comprising:
a memory for storing a set of instructions; and
at least one processor configured to execute to the set of instructions to cause the apparatus to perform:

receiving, via a first guest flash translation layer (FTL) instance of a first virtual machine running on a guest operating system of the host machine, a first request for accessing the storage device from the first virtual machine, wherein the first request comprises a first physical address of the storage device;
transmitting, via the first guest FTL instance, the first request to a host FTL driver running on a host operating system of the host machine;
converting, via the host FTL driver, the first request into a first hardware command;
transmitting, via the host FTL driver, the first hardware command to the storage device; and
executing, via the storage device, the first hardware command to access the first physical address.

12. The apparatus according to clause 11, wherein the at least one process is configured to execute the set of instructions to cause the apparatus to further perform:
receiving, via a second guest FTL instance, a second request for accessing the storage device from a second virtual machine running on the host machine; and
converting, via the host FTL driver, the second request into a second hardware command, wherein the second request comprises a second physical address of the storage device.

13. The apparatus according to clause 12, wherein the at least one process is configured to execute the set of instructions to cause the apparatus to further perform:
operating a first group of parallel units (PUs) associated with the first physical address according to the first hardware command; and
operating a second group of PUs associated with the second physical address according to the second hardware command, wherein the first group of PUs and the second group of PUs have no common PU.

14. The apparatus according to clause 13, wherein the first group of PUs is only accessible by the first virtual machine and the second group of PUs is only accessibly by the second virtual machine.

15. The apparatus according to any one of clauses 12-14, wherein
the guest OS comprises a first guest queue for storing the first request and a second guest queue for storing the second request, the first and second guest queues being accessible by the host FTL driver; and
the storage device comprises a first host queue for storing the first hardware command and a second host queue for storing the second hardware command, the first and second host queues being accessible by both the host FTL driver and the storage device.

16. The apparatus according to any one of clauses 11-15, wherein the at least one process is configured to execute the set of instructions to cause the apparatus to further perform:
transmitting, via the storage device, a post completion signal to the host FTL driver;
converting, via the host FTL driver, the post completion signal into a guest response to the guest FTL instance; and
transmitting, via the host FTL driver, the guest response to the guest FTL instance.

17. The apparatus according to any one of clauses 11-16, wherein the first request comprises an input/output (IO) request or an administration request.

18. The apparatus according to clause 17, wherein
the IO request comprises a first operation code field, a start physical address field, a first data buffer field, and a first data buffer length field; and the administration request comprises a second operation code field, a second data buffer field, and a second data buffer length field.

19. The apparatus according to clause 17 or 18, wherein the IO request is associated with a read command, a write command, or an erase command, and the administration request is associated with a geometry command, a bad block table command, an identify command, or a format command.

20. A host machine including one or more non-transitory computer readable mediums that store a set of instructions that is executable by at least one processor of the host machine to cause the host machine to perform a method for accessing a storage device of a host machine, the method comprising:

receiving, via a first guest flash translation layer (FTL) instance of a first virtual machine running on a guest operating system of the host machine, a first request for accessing the storage device from the first virtual machine, wherein the first request comprises a first physical address of the storage device;

transmitting, via the first guest FTL instance, the first request to a host FTL driver running on a host operating system of the host machine;

converting, via the host FTL driver, the first request into a first hardware command;

transmitting, via the host FTL driver, the first hardware command to the storage device; and executing, via the storage device, the first hardware command to access the first physical address.

The flow charts and diagrams in the figures illustrate the architecture, functionality, and operation of possible implementations of devices, methods, and computer program products according to various embodiments of the specification. In this regard, a block in the flow charts or diagrams may represent a software program, segment, or portion of code, which comprises one or more executable instructions for implementing specific functions. It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the diagrams and/or flow charts, and combinations of blocks in the diagrams and flow charts, may be implemented by special purpose hardware-based systems that perform the specified functions or acts, or combinations of special purpose hardware and computer instructions.

It is appreciated that certain features of the specification, which are, for clarity, described in the context of separate embodiments, may also be provided in combination in a single embodiment. Conversely, various features of the specification, which are, for brevity, described in the context of a single embodiment, may also be provided separately or in any suitable subcombination or as suitable in any other described embodiment of the specification. Certain features described in the context of various embodiments are not to be considered essential features of those embodiments, unless the embodiment is inoperative without those elements.

Although the specification has been described in conjunction with specific embodiments thereof, it is evident that many alternatives, modifications and variations will be apparent to those skilled in the art. For example, although some embodiments are described using processing of a matrix of input data as an example, the described systems and methods can be applied to any parallel computation tasks. Accordingly, it is intended to embrace all such alternatives, modifications and variations that fall within the spirit and broad scope of the appended claims.

What is claimed is:

1. A computer-implemented method for accessing a storage device of a host machine, comprising:
    initializing a first guest flash translation layer (FTL) instance of a first virtual machine running on a guest operating system of the host machine and a host FTL driver running on a host operating system of the host machine in parallel;
    receiving, via the first guest FTL instance of the first virtual machine, a first request for accessing the storage device from the first virtual machine, wherein the first request comprises a first physical address of the storage device;
    transmitting, via the first guest FTL instance, the first request to the host FTL driver and parsing the first request by the host FTL driver to determine if the first request is associated with an accessible range of physical addresses, wherein a communication between the first guest FTL instance and the host FTL driver is through a virtual queue created by the guest operating system;
    converting, via the host FTL driver, the first request into a first hardware command;
    transmitting, via the host FTL driver, the first hardware command to the storage device; and
    executing, via the storage device, the first hardware command to access the first physical address.

2. The method according to claim 1, further comprising:
    receiving, via a second guest FTL instance, a second request for accessing the storage device from a second virtual machine running on the host machine; and
    converting, via the host FTL driver, the second request into a second hardware command, wherein the second request comprises a second physical address of the storage device.

3. The method according to claim 2, further comprising:
    operating a first group of parallel units (PUs) according to the first hardware command, wherein the first physical address associated with the first hardware command is directed to one or more PUs of the first group of PUs; and
    operating a second group of PUs according to the second hardware command, wherein the second physical address associated with the second hardware command is directed to one or more PUs of the second group of PUs, wherein the first group of PUs and the second group of PUs have no common PU.

4. The method according to claim 3, wherein the first group of PUs is only accessible by the first virtual machine and the second group of PUs is only accessibly by the second virtual machine.

5. The method according to claim 2, wherein
    the guest OS comprises a first guest queue for storing the first request and a second guest queue for storing the second request, the first and second guest queues being accessible by the host FTL driver; and
    the storage device comprises a first host queue for storing the first hardware command and a second host queue for storing the second hardware command, the first and second host queues being accessible by both the host FTL driver and the storage device.

6. The method according to claim 1, further comprising:
transmitting, via the storage device, a post completion signal to the host FTL driver;
converting, via the host FTL driver, the post completion signal into a guest response to the first guest FTL instance; and
transmitting, via the host FTL driver, the guest response to the first guest FTL instance.

7. The method according to claim 1, wherein the first request comprises an input/output (IO) request or an administration request.

8. The method according to claim 7, wherein
the IO request comprises a first operation code field, a start physical address field, a first data buffer field, and a first data buffer length field; and
the administration request comprises a second operation code field, a second data buffer field, and a second data buffer length field.

9. The method according to claim 7, wherein
the IO request is associated with a read command, a write command, or an erase command, and
the administration request is associated with a geometry command, a bad block table command, an identify command, or a format command.

10. The method according to claim 5, further comprising:
starting the host FTL driver on the host operating system;
creating a first queue on the storage device;
starting a guest FTL driver on the guest operating system;
creating a virtual storage device and a second queue; and
initializing the first FTL instance using the guest FTL driver.

11. An apparatus, comprising:
a memory for storing a set of instructions; and
at least one processor configured to execute to the set of instructions to cause the apparatus to perform:
initializing a first guest flash translation layer (FTL) instance of a first virtual machine running on a guest operating system of the host machine and a host FTL driver running on a host operating system of the host machine in parallel;
receiving, via the first guest FTL instance of the first virtual machine, a first request for accessing the storage device from the first virtual machine, wherein the first request comprises a first physical address of the storage device;
transmitting, via the first guest FTL instance, the first request to the host FTL driver and parsing the first request by the host FTL driver to determine if the first request is associated with an accessible range of physical addresses, wherein a communication between the first guest FTL instance and the host FTL driver is through a virtual queue created by the guest operating system;
converting, via the host FTL driver, the first request into a first hardware command;
transmitting, via the host FTL driver, the first hardware command to the storage device; and
executing, via the storage device, the first hardware command to access the first physical address.

12. The apparatus according to claim 11, wherein the at least one processor is configured to execute the set of instructions to cause the apparatus to further perform:
receiving, via a second guest FTL instance, a second request for accessing the storage device from a second virtual machine running on the host machine; and
converting, via the host FTL driver, the second request into a second hardware command, wherein the second request comprises a second physical address of the storage device.

13. The apparatus according to claim 12, wherein the at least one processor is configured to execute the set of instructions to cause the apparatus to further perform:
operating a first group of parallel units (PUs) associated with the first physical address according to the first hardware command, wherein the first physical address associated with the first hardware command is directed to one or more PUs of the first group of PUs; and
operating a second group of PUs associated with the second physical address according to the second hardware command, wherein the second physical address associated with the second hardware command is directed to one or more PUs of the second group of PUs, wherein the first group of PUs and the second group of PUs have no common PU.

14. The apparatus according to claim 13, wherein the first group of PUs is only accessible by the first virtual machine and the second group of PUs is only accessibly by the second virtual machine.

15. The apparatus according to claim 12, wherein
the guest OS comprises a first guest queue for storing the first request and a second guest queue for storing the second request, the first and second guest queues being accessible by the host FTL driver; and
the storage device comprises a first host queue for storing the first hardware command and a second host queue for storing the second hardware command, the first and second host queues being accessible by both the host FTL driver and the storage device.

16. The apparatus according to claim 11, wherein the at least one processor is configured to execute the set of instructions to cause the apparatus to further perform:
transmitting, via the storage device, a post completion signal to the host FTL driver;
converting, via the host FTL driver, the post completion signal into a guest response to the first guest FTL instance; and
transmitting, via the host FTL driver, the guest response to the first guest FTL instance.

17. The apparatus according to claim 11, wherein the first request comprises an input/output (IO) request or an administration request.

18. The apparatus according to claim 17, wherein
the IO request comprises a first operation code field, a start physical address field, a first data buffer field, and a first data buffer length field; and
the administration request comprises a second operation code field, a second data buffer field, and a second data buffer length field.

19. The apparatus according to claim 17, wherein
the IO request is associated with a read command, a write command, or an erase command, and
the administration request is associated with a geometry command, a bad block table command, an identify command, or a format command.

20. A host machine including one or more non-transitory computer readable mediums that store a set of instructions that is executable by at least one processor of the host machine to cause the host machine to perform a method for accessing a storage device of a host machine, the method comprising:
initializing a first guest flash translation layer (FTL) instance of a first virtual machine running on a guest operating system of the host machine and a host FTL driver running on a host operating system of the host machine in parallel;

receiving, via the first guest FTL instance of the first virtual machine, a first request for accessing the storage device from the first virtual machine, wherein the first request comprises a first physical address of the storage device;

transmitting, via the first guest FTL instance, the first request to the host FTL driver and parsing the first request by the host FTL driver to determine if the first request is associated with an accessible range of physical addresses, wherein a communication between the first guest FTL instance and the host FTL driver is through a virtual queue created by the guest operating system;

converting, via the host FTL driver, the first request into a first hardware command;

transmitting, via the host FTL driver, the first hardware command to the storage device; and executing, via the solid state drive, the first hardware command to access the first physical address.

* * * * *